Figure 1:
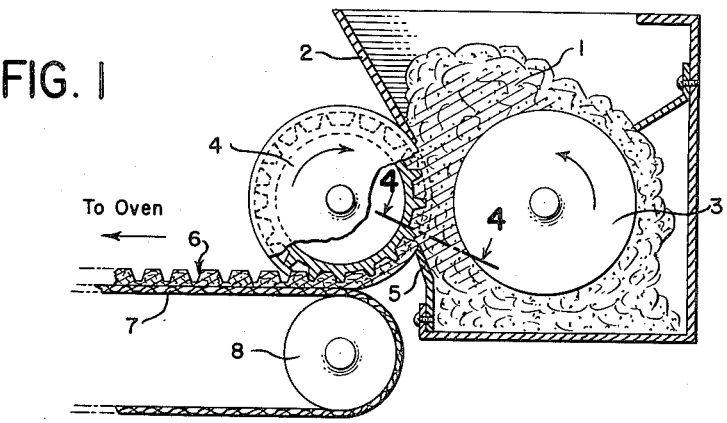

March 6, 1962

H. M. BURGESS 3,024,112

PRODUCTION OF BISCUITS

Filed July 10, 1958

2 Sheets-Sheet 1

INVENTOR.
Hovey M. Burgess
BY

ATTORNEY

March 6, 1962 H. M. BURGESS 3,024,112
PRODUCTION OF BISCUITS

Filed July 10, 1958 2 Sheets-Sheet 2

INVENTOR
Hovey M. Burgess
BY
Carl G. Seutter
ATTORNEY 3,024,112
PRODUCTION OF BISCUITS
Hovey M. Burgess, Battle Creek, Mich., assignor to General Foods Corporation, White Plains, N.Y., a corporation of Delaware
Filed July 10, 1958, Ser. No. 747,726
2 Claims. (Cl. 99—2)

This invention relates to the production of biscuits, and particularly to production of biscuits under conditions such that attendant production of unusable fines is minimized. More particularly, this invention relates to a novel type biscuit which, when produced in large quantity, is characterized by absence of fines within the bulk and by a comparatively high degree of adsorptivity of the individual biscuit.

As heretofore prepared, biscuits of the dog biscuit type have been produced according to various techniques. Dog biscuits, as the term is commonly used, refers to a discrete, usually large sized cake which is formed docked (i.e. stamped) or cast within a mold as a separate entity and is baked as such. It is characterized by a comparatively hard baked or glazed surface. Although it possesses many advantages when eaten dry, it cannot, as a practical matter, be readily wet because the glazed surface is substantially completely resistant to ready passage therethrough of aqueous liquids such as water or milk.

A second common form in which dog food of the biscuit type is produced is in a finely divided form. This type of product, frequently referred to as "kibbled," may be prepared in a variety of sizes. Commonly, however, it is prepared in a size which may be of the order of 1/16 to 1/4 inch although it may be in pieces as large as 1/2 to 3/4 inch. This product is in form readily suitable for use under conditions such that when a liquid is added, the liquid is readily adsorbed and the product becomes soft and readily edible.

The rough, open-faced surface of kibbled food which, together with its more or less characteristic non-uniform size, are the main distinguishing features of this product, is typically obtained by a standard method of production. A sheet of dough may be baked and subsequently broken into small pieces by appropriate means. The fracture of the sheet produces in the kibbled product a comparatively high ratio of open unglazed adsorptive surface to closed glazed non-adsorptive surface; the latter surface, of course, is derived from the portion of the sheet which was directly subjected to the high degree of convection and radiant heat within the baking oven.

As is well known to those skilled-in-the-art, purchasing consumers of dog foods as well as ultimate consumers, uniformly consider a desirable product as one which is substantially homogeneous. A product containing a mixture of the entire mass resulting from a kibbling operation and including, for example, particles ranging in size from perhaps 0.25 to 0.50 or 0.75 inch down to 300–400 mesh powder is not commercially desirable. Among the reasons for this may be noted the non-uniform adsorptive properties, the difficulties of handling, and its non-uniform properties due to classification of the different particle sizes in the package during storage and usage of the product. From the point of view of the producer, the large amount of fines or powder which would be present if the entire production of a kibbling operation were packaged would present several problems. Firstly, there are the difficulties inherent in handling any non-uniform product, including, for example, non-uniformity of product within a package, short-weight packages, and packages which, while of standard weight, appear to be short-weight because of the large amount of head space in the container resulting from the presence of high-density fines, i.e. slack-filling. Furthermore, the presence of fines makes the machinery-protection problem more severe since these fines which are very abrasive, if not kept out of machinery, would normally result in additional mechanical difficulties.

From the point of view of the ultimate consumer of dog biscuits, i.e. the dog, it has almost uniformly been found that the response to a powdered food, to a food containing a substantial proportion of powder, or to a non-homogeneous food of the type noted, is low. Dogs show a high preference for a kibbled product of uniform size which has been wet with aqueous liquid, rather than a material containing a large proportion of fines. More specifically, it has been found that dogs prefer larger size particles (up to about 0.5 inch) and presence of fines or smaller particles detracts considerably from palatability.

For many reasons, including the above, it has thus long been a desideratum to produce a uniformly sized dog biscuit having the advantages of the kibbled product on the one hand and also of the cast or molded dog biscuit type product on the other, without having the attendant disadvantages of either. More specifically, those skilled-in-the-art have long tried to produce what is essentially a kibbled product, but under conditions such that the amount of fines produced was low, while the adsorptivity of the product was high. That this has been difficult, if not commercially impossible, has been proved by the fact that there has long been no such product on the market. The commercial product which most closely approaches the desired product has been produced by baking a sheet of dough and attempting to break the hard-baked sheet into the desired sized particles. This operation has resulted in the almost uniformly high production of fines, i.e. unusable by-product, in amount as high as 60% by weight of the dough sheet fed to the breaking device. The fine-free product is characterized by high friability, and low resistance to breakage.

One technique which has been used in an attempt to produce the desired product without attendant production of an inordinate amount of fines includes the formation of a sheet of dough wherein the surface of the sheet has been scored by means of a sharp razor or knife, it being intended that the sheet, after baking, should break apart along the scored lines. This has not proved to be a satisfactory solution to the problem, because biscuits of the type under consideration are so hard that substantially no advantage is obtained from the scoring. Another attempt to solve the problem has included the formation of a sheet of biscuits and then dividing the biscuit sheet into a number of sections of desired shape by merely cutting through much of the thickness of the biscuit with a thin sharp knife. Such a teaching is shown e.g. in British Patent 3,341 of 1885 to Rastrick. This technique substantially fails to solve the problem of producing uniformly sized biscuits of the type hereinbefore noted without production of substantially any fines.

Thus, as a practical matter, in commercial practice the unusable fines in amount up to 60% by weight of the baked sheet have commonly been reworked. Typically, this may be effected by blending this fine material with raw material for a succeeding batch of biscuit dough or by using it in some other less profitable way i.e. in a product which has a less attractive market.

It is an object of this invention to provide a technique for producing biscuits having properties of the kibbled type under conditions such that the amount of fines formed during the production is substantially negligible. It is another object of this invention to produce a dog biscuit possessing many of both the advantages of the cast or molded biscuit and of the kibbled biscuit without the attendant disadvantages of either. Other objects of this invention will be apparent to those skilled-in-the-art on inspection of the accompanying drawing and the following description.

According to certain aspects of this invention it is possible to prepare kibbled biscuits characterized by rough unglazed edges which permit increased adsorption of aqueous liquids by the process which comprises forming a workable dough of sufficient moisture content to yield acceptable liquid adsorption characteristics when the dough is baked and broken, forming said dough into a biscuit sheet, forming a plurality of separated, preferably frusto-pyramidal, biscuits in said sheet interconnected by distinct sections of dough of a thickness such that on baking said interconnecting sections dry out more rapidly than said biscuits and form when broken biscuit edges of substantial cross-section, the sides of said biscuits being so disposed with respect to said sections that the latter are exposed directly to heat during baking, baking said sheet to reduce the moisture content thereof and to lower the moisture content of said sections below that of said biscuits to the point that upon cooling said sections are brittle and said biscuits are thermoplastic, cooling said sheet, and breaking said sheet into individual biscuits at said brittle interconnecting sections.

According to a preferred embodiment of this invention, biscuits may be produced by blending 50-60 parts by weight of aqueous liquid into about 100 parts by weight of dry ingredients containing predominantly wheat flour, thereby forming a wheat dough, forming the dough into a biscuit sheet; forming a plurality of spaced separated biscuits in said sheet interconnected by or separated from each other by sections of dough of thickness of about 25%-50% of thickness of the biscuits, the interconnecting or separating sections being thin enough so that, on baking, they will dry out more rapidly than the thicker biscuits and being of a width above that at which after baking and cooling the sheet will break faithfully across said sections instead of across said biscuits but being below that width at which uneven broken edges of said sections result when said sheet is broken; baking the sheet whereby the moisture content of the biscuits is reduced to 17%-20% and the moisture content of the interconnecting or separating dough sections is reduced to 7%-12%; cooling said sheet to a temperature, preferably 150° F.-165° F., at which the interconnecting or separating sections are brittle and may be snapped; and breaking or snapping said sheet through the said interconnecting or separating dough sections into individual biscuits.

In the preparation of the biscuits according to the present invention, it is preferred to employ wheat flour and preferably hard wheat flour. Preferably, the solid content of the dough will be predominantly (i.e., at least one-half) wheat flour, and under preferred conditions it will be as high as about 73% hard wheat flour. The remaining components of the solid portion of the biscuit dough may include a leavening agent such as baking powder, preferably at the optimum level of about 1% by weight of the dry ingredients. The use of leavening provides a more porous product and aids in achieving the desired high rate of liquid adsorption. Other ingredients which may be included within the solid portion of the dough stock include soy bean meal, meat and meat derivatives, bone meal, fish meal, fat, as well as desired vitamin and mineral supplements to provide in the ultimate product the proper taste and nutritional balance.

Under preferred conditions, the solid portion of the dough stock is mixed with aqueous liquid which will be water or milk. It has been found that acceptable results are obtained when about 50-60 lbs. of aqueous liquid are employed per 100 lbs. of dry ingredients. The preferred range corresponds to an aqueous liquid concentration of about 35%-40% in the final dough. If the aqueous liquid content of the dough be substantially above or below this preferred range, it may not be possible to fully realize the highly advantageous features of this invention as herein expressed. More specifically, use of liquid in amounts substantially in excess of about 40% provides a dough which is too wet to work conveniently which renders it substantially impossible to conduct the process hereinafter set forth. If the liquid level be substantially less thant 33%-34%, it is found that the product biscuit possesses an undesirably low liquid adsorption, and an unsatisfactory density. Preferably, the aqueous liquid should be at a temperature of about 100° F.-160° F., depending to some extent whether it is water or milk, the lower temperatures providing more efficient leavening action prior to baking, but the higher temperatures facilitating the actual dough preparation. All things considered, a temperature of about 160° F. is preferred wherever possible.

Figure 2:
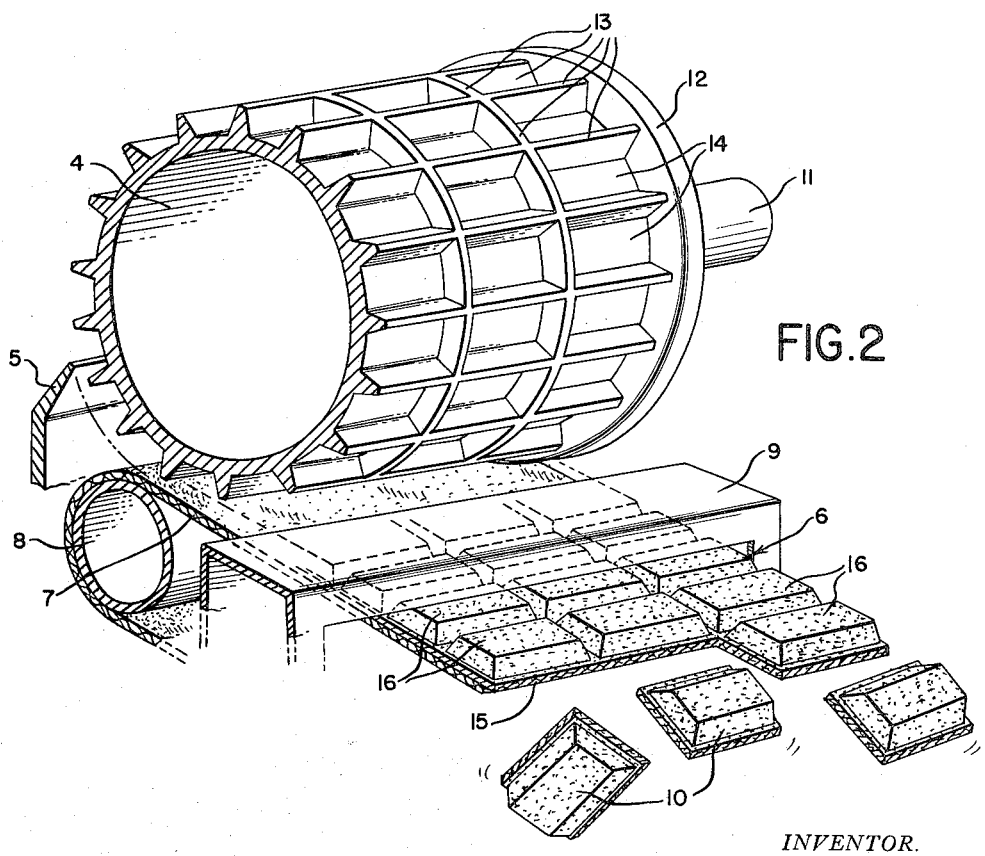
Figure 3:
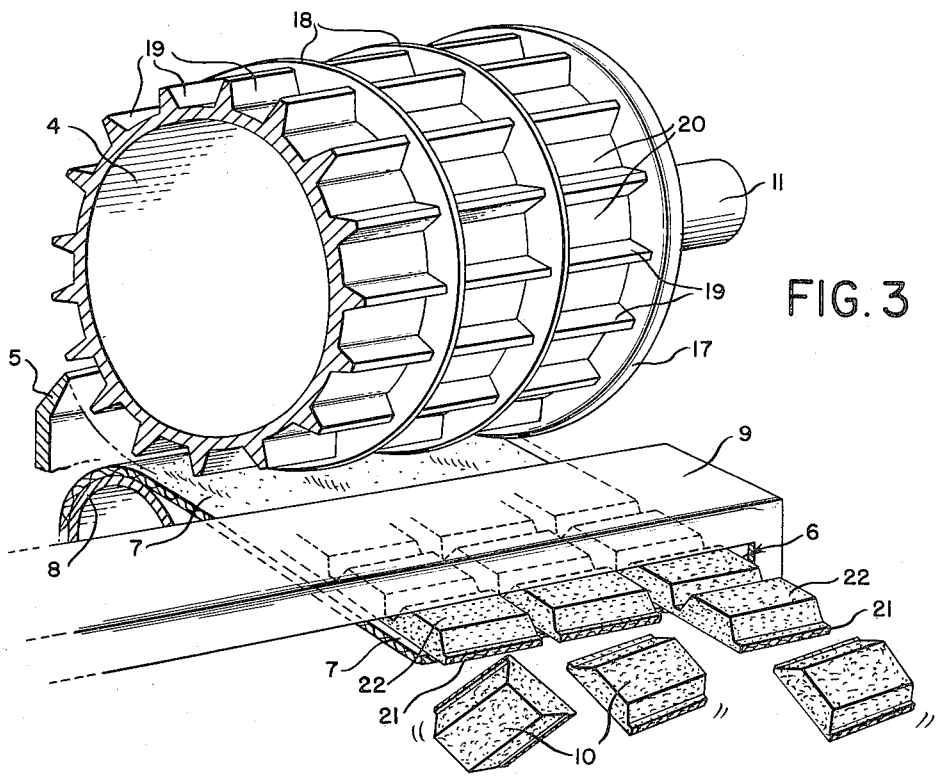
Figure 4:
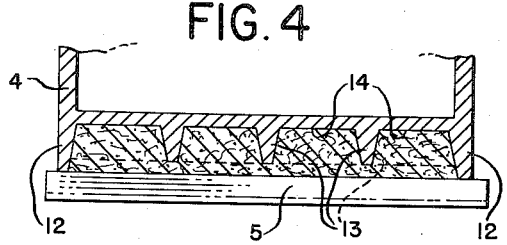
Figure 5:
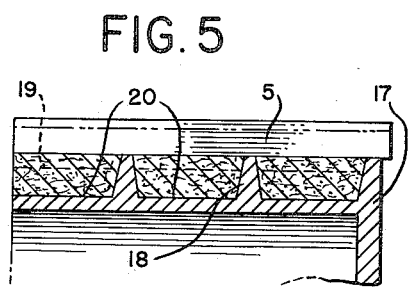
Figure 6:
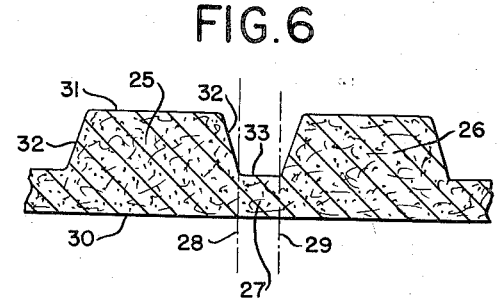

Formation of the dough sheet from a mass of dough and subsequent treatment in accordance with this invention to produce the novel product herein described may be most conveniently understood by reference to application Serial No. 582,562, filed May 3, 1956, for Biscuit Making Apparatus, inventors Hovey M. Burgess and Harvey H. Grice (now U.S.P. 2,837,043), and by reference to the accompanying drawing wherein FIG. 1 is a side view partly in section, diagrammatically illustrating a die and associated apparatus useful in practicing this invention; FIGS. 2 and 3 are perspective views partly in section, illustrating two different dies which may be used in connection with this invention; FIGS. 4 and 5 are respectively sectional views on radial planes of the dies illustrated in FIGS. 2 and 3 respectively; and FIG. 6 is a considerably enlarged view of a portion of the dough sheet.

The apparatus shown in the drawings is adapted to carry out continuously the process of the invention. A mass 1 of dough is contained in a hopper 2 to which it may be supplied continuously. Rotating in the hopper 2 is a pressure roll 3, preferably a smooth roll, which opposes a rotating die roll 4 of the type described in detail hereinafter. The outer surface of the die roll comprises a plurality of suitably arranged rib-like projections defining pockets or molds which receive the dough and shape the biscuits. To this end the die roll projects into the hopper 2 through an opening in its wall and the dough mass 1 is fed between the rolls 3 and 4 by their rotation and is pressed into the pockets in the die roll surface. Excess dough is scraped from the surface of the die roll and returned to the hopper 2 by a suitable doctor blade or scraper 5 located below the point of closest approach of the two rolls 3, 4 and conveniently forming a part of the wall of the hopper itself. Beyond the doctor blade 5 and outside the hopper, a molded sheet or strip of dough 6 is stripped from the bottom of the rotating die roll 4 and carried off by any suitable conveying means here shown as a belt 7 passing around a drive roll 8. It will be understood from the foregoing description that the conveyor 7 carries the strip to a baking oven, as indicated diagrammatically at 9 in FIGURES 2 and 3, and thence to a breaking mechanism where the strip is broken up into individual biscuits 10 as indicated in these figures.

FIGURES 2-5 inclusive illustrate in greater detail the construction and operation of the die roll and its operating doctor blade. The die roll comprises a generally cylindrical structure mounted to rotate. The die surface can be made up of preformed die members of desired number, size, and shape which may be connected and supported for rotation. For simplicity, the drawings show a cylindrical die roll of one-piece hollow construction, but it will be understood that any other convenient construction can be employed.

Generally described, the die roll 4 has circumferential ribs in parallel planes which define between them a biscuit-forming space having the width of the continuous strip 6 mentioned above, which width may be that of any desired number of biscuits as hereinafter explained. The space between these ribs is traversed by rib-like projections which form a plurality of dough-receiving pockets or biscuit molds. The doctor blade 5 has scraping engagement with the circumferential ribs and extends across the space therebetween, preferably in a substantially straight line, but the rib-like projections between the circumferential ribs are of less height than the ribs so that their outer edges are spaced from the doctor blade. Thus the rotating roll and blade cooperate to form between the circumferential ribs a continuous strip 6 which is removed from the bottom of the roll as described above, the upper surface of this strip having thereon a plurality of raised biscuit shapes. It will be understood that the strip may be thus subdivided into any desired number of frusto-pyramidal biscuits. In any case, however, the base of the strip is a continuous layer having a thickness equal to the difference in height between the outer edges of the rib-like projections and the outer edges of the circumferential ribs, this layer providing the thin dough sections which interconnect the individual biscuits. The thickness of these sections should be about one quarter to one half the height of the biscuits. The width of said sections (i.e., the space between the feet of biscuit sides) being determined by the width of said rib-like projections and being above that at which, after baking and cooling, the sheet can be broken faithfully across said sections; the width of said sections is below that at which uneven section edges result when said sections are broken. The rib-like projections have blunt or flat outer edges and increase in thickness toward their bottoms, i.e., toward the axis of the roll, the degree of taper being such that the strip pulls free from the roll without undue risk of breakage.

FIGURES 2 and 4 show a roll for forming a strip having the width of four biscuits. The roll 4 is shown as a hollow one-piece cylindrical body having a suitable trunnion or shaft 11 whereby it is mounted for rotation in any suitable manner. The roll 4 is provided at each end with a circumferential rib 12 projecting outwardly from the surface of the roll by a distance equal to the thickness of the biscuits to be made. The doctor blade 5 has scraping engagement with the spaced circumferential ribs 12 and extends across the space therebetween in a straight line as illustrated in FIGURE 4.

The space between the ribs 12 is traversed by a plurality of intersecting circumferential and axially extending rib-like projections 13 which intersect one another to form dough-receiving pockets or biscuit molds 14. As shown, the biscuit shapes are rectangular in cross-section and the strip has the width of four biscuits.

As shown in FIGURE 2 and in greater detail in FIGURE 4, the height of the rib-like projections 13 is less than that of the ribs 12 so that the outer edges of the projections 13 are spaced from the edge of the doctor blade 5. The result is that the projections 13 form grooves extending only partway through the thickness of the mass of dough confined between the ribs 12 and the blade 5. When the continuous strip is removed from the bottom of the roll as illustrated in FIGURE 2, therefore, the strip comprises a continuous bottom layer 15 and a plurality of superposed molded biscuit shapes 16 thereon. It will be seen that after baking, when the strip is broken up into individual biscuits, there will be rough, freshly broken edges around the individual biscuits that are the same in width as the thickness of the continuous bottom layer 15. These broken edges facilitate adsorption of aqueous liquid as described above, while at the same time excessive breakup of the material into fines is avoided.

The continuous biscuit strip 6 may have any desired width and FIGS. 3 and 5 illustrate strips having the width of a single biscuit only. Preferably, however, the roll is arranged to form a series of such narrow strips side-by-side. These results are accomplished by the roll structure shown in FIGS. 3 and 5 which comprises an end circumferential rib 17 and a plurality of similar circumferential ribs 18 all of the same height, said ribs arranged in parallel planes and spaced axially by the width of the narrow strips to be formed or in other words by the width of one biscuit. In this case the rib-like projections 19 which traverse the space between each pair of circumferential ribs extend in axial direction between and interconnect the ribs to provide dough pockets 20, these projections 19 being of less height than the ribs as indicated by the dotted line in FIG. 5. It will be understood, of course, that the frusto-pyramidal dough-receiving pockets 14 and 20 may be given any desired cross-sectional shape by suitably arranging the rib-like projections such as those shown at 13 and 19. Also different cross-sectional shapes can be provided in side-by-side strips, either as parts of a plural-row strip 6 as shown in FIG. 2 or as separate side-by-side strips 6 as shown in FIG. 3.

A dough sheet containing the ingredients hereinbefore noted and preferably prepared by the apparatus hereinbefore described will, under preferred conditions, have a total biscuit (i.e., a sheet) thickness or height of about approximately 9/32 inch. Because of the technique employed in its preparation, the dough sheet will contain a plurality of separated frusto-pyramidal biscuits, each having a thickness or height the same as the dough sheet, i.e., preferably 9/32 inch, interconnected or separated by sections of dough of a thickness of about 25%–50% of the thickness of the biscuit—preferably about 4/32 inch. The interconnecting sections of dough which connect the separated biscuits or (alternatively expressed) which separate discrete biscuits from each other, are a characteristic feature which contributes substantially to the invention, preferably the width of the interconnecting section is of the order of 4/32 inch. Because of the frusto-pyramidal configuration of the biscuits and the presence of these interconnecting or separating sections, it is possible to obtain different properties in the biscuit and in the interconnecting sections after baking as hereinbefore noted. More specifically, the biscuit sheet is formed under conditions such that the interconnecting or separating sections are sufficiently thin so that when subjected to baking they dry out more rapidly than the thicker biscuits whereby the brittle section may be broken or snapped without injury to the biscuits. The die which forms the individual biscuits from the sheet is so constructed that the interconnecting sections are exposed to the heat of the oven.

The oven in which the biscuit sheet is baked, i.e., the standard type baking oven, is so designed that a large portion of the heat supplied to the biscuit sheet is in the form of radiant heat. As is well known to those skilled-in-the-art, radiant heat acts upon those portions of a heated mass which it can "see." Because of the particular configuration of the biscuit sheet of the instant application, and in particular because of the combination of the frusto-pyramidal shape of the discrete biscuit and the separating or interconnecting dough sections between discrete biscuits, the heat is readily able to reach the interconnecting dough portions and to provide therein the degree of heating necessary to reduce the moisture content to the desired level as hereinafter noted.

It may be noted that prior art attempts, typified by the hereinbefore mentioned patent to Rastrick, to effect the results obtained by practice of this invention fail to show either the frusto-pyramidal biscuit configuration or the presence of discrete separating or interconnecting portions of a biscuit sheet. Rather do they show a plurality of biscuits in a sheet wherein a series of slits has been made, the resulting configuration being essentially a plurality of biscuits which are immediately coterminous at the lower portions thereof and which approach or touch each other at upper portions. On heating, the prior art biscuits expand somewhat because of the action of the leavening agent and the plasticity of the dough, to substantially close the slits. No radiant heat could possibly "see" (nor could any convection heat contact) any substantial portion of the sheet between the touching substantially cube-shaped biscuits. Because the entire sheet has been baked to a homogeneous final moisture content and the heating has in fact undone the advantages which were sought by splitting the sheet, it has been found that the biscuits become re-secured together during the heating and the resulting sheet is substantially difficult to impossible to break into separate biscuits without fracture of a large portion of the biscuits and production of fines.

In the preferred embodiment of this invention, the biscuit sheet is preferably baked at a baking temperature of the order of 450° F.–475° F. The optimum duration of baking is of the order of 7.5–8.5 minutes.

Under the preferred conditions of baking, including the biscuit sheet thickness, the interconnecting section thickness and the time and temperature conditions noted, the moisture content of the thicker section of the biscuit sheet is reduced from about the preferred 35%–40% range to approximately 17%–20%; simultaneously, the moisture content of the interconnecting sections is reduced to about 7%–12%.

The structure of the biscuit sheet may be most readily observed by inspection of FIGURE 6 of the drawing, which is a considerably enlarged view of a cross-section of a dough sheet. Biscuits 25 and 26 are shown as adjoining biscuits in the biscuit sheet. These separate, distinct, discrete biscuits are separated from and interconnected to each other by interconnecting dough section 27, which is defined essentially by the two dotted lines 28 and 29. It is apparent that the dough section 27 is not a portion of either biscuit 26, but rather that it is a separate section which connects the two spaced biscuits 25 and 26. Biscuit 25 (and also of course biscuit 26 which is its duplicate) has a generally frusto-pyramidal configuration. In this embodiment it has a bottom 30, a top 31, both of which are flat and preferably generally falling in the horizontal plane. Four slant faces, typified by faces 32 essentially complete the frusto-pyramidal biscuit as it occurs in the biscuit sheet. All of these faces 30, 31 and 32, under normal conditions of operation occurring during baking, will be baked to a point at which they have a glazed finish, the baking conditions in the preferred embodiment being such that the moisture content in the biscuit 25 has been reduced from about 35%–40% to about 17%–20%. The interconnecting section 27 has been subjected to a greater degree of heating because of the openness of the configuration, i.e., the slant surfaces 32 of the biscuit provide no obstacle to radiant or convection heat reaching the surface 33 of the connecting section 27. Since the section 27 is 25%–50% of the thickness of the biscuit 25, any radiant heat which hits face 33 (as well as the lower surface of the connection section) will be such as to provide higher volumetric heat fluxes into the mass of section 27, i.e., although the heat will fall on the surface 33 at the same rate (when expressed in terms of B.t.u. per square inch) as it does on surface 31; since there is a smaller depth under surface 33 than there is under surface 31, the degree of heating in section 27 (expressed in terms e.g., of B.t.u. per cubic inch) will be much greater than the degree of heating in biscuit 25. Thus, although the interconnecting section will have been subjected to the same temperature for the same length of time, it will be heated to a greater degree of severity— preferably sufficient to reduce its moisture content to about 7%–12%.

The sheet which has been baked to a biscuit moisture content of 17%–20% and interconnecting section moisture content of about 7%–12% may then be passed to the breaking operation.

While moisture content of the interconnecting sections at the time of breaking to provide the individual biscuits is a factor to be carefully controlled, the temperature of such sections is also a factor to be considered. The baked dough is to some extent thermoplastic, and for that reason a better breaking is obtained at temperatures considerably below those used in baking, i.e. at lower temperatures at which the brittle interconnecting sections may be snapped or broken. Optimum temperatures for the breaking have been determined to be of the order of 150° F.–165° F. with sections of 2/32–4/32 inch thick although temperatures appreciably above and below this range may also be employed with success and optimum temperatures vary with dough composition, thickness of the section and other factors. At temperatures appreciably above this range an increasingly high percentage of biscuits pass through the mechanical breaking equipment without being separated into the individual biscuits because of the higher plasticity of the sheet and more particularly of the interconnecting sections. On the other hand, at temperatures appreciably below this range an increasing number of breaks in the biscuit itself results, not being limited to the interconnecting sections because the biscuits themselves have lost their thermoplasticity.

The breaking operation discussed above may typically be carried out in a horizontally mounted revolving roll on which is mounted a plurality of fingers, say, about 6 inches long and ½–1 inch thick, the roll revolving at about 200 r.p.m. The separate biscuits are conveyed away from the breaker by a screening device which serves to separate the fines from the biscuits and later the individual biscuits from ones not separated. Generally, the properly formed and completely separated biscuits are obtained in a yield of about 97% with only about 3% fines which must be reworked. The usual so-called "kibbling" process in which a uniformly thick dough sheet is broken up usually yields no more than 40% of the "kibbled" biscuits. Much of the material is unacceptable because it needs to be subjected to further breakage but a very large percentage is fines which must be reworked completely.

An example of the process of the present invention is set forth in deail below.

100 pounds of dry ingredients of the following composition are prepared:

| | Percent |
|---|---|
| Hard wheat flour | 72.94 |
| Soybean oil meal | 8.0 |
| Meat and bone meal | 6.0 |
| Fish meal | 3.5 |
| Wheat germ | 3.0 |
| Brewer's yeast | .5 |
| Salt | .5 |
| Vitamin and mineral supplements | 1.0 |
| Animal fat | 3.5 |
| Leavening | 1.0 |
| Certified food coloring | .06 |

To these ingredients are added 55 pounds of skim milk at a temperature of about 160° F. The dough is prepared by mixing in a dough mixer and then fed to a biscuit die which forms a dough sheet of individual biscuits about 9/32 inch thick in which said biscuits are interconnected by relatively thin dough sections about 4/32 inch thick and wide. This dough or biscuit sheet is conveyed to an oven operating at a temperature of about 450° F.–475° F., said dough sheet remaining therein for 7½–8½ minutes. Upon being removed, the interconnecting sections have a moisture content of about 7%–12%, the biscuits having about 17%–20% moisture, and after the dough sheet has been cooled to a point where said interconnecting sections are at a temperature of about 150° F.–165° F. the baked sheet is put through a mechanical breaker to separate the baked sheet into the individual biscuits, the breaker comprising a horizontally mounted roll on which are mounted a plurality of fingers of 6 inches long and 1 inch thick revolving at about 200 r.p.m. The separated biscuits are conveyed from the breaker and screened to remove fines and unseparated biscuits. The biscuits obtained in 97% yield are further cooled, packaged and are ready for distribution through regular commercial channels.

The individual biscuits produced in accordance with this invention contain predominantly wheat flour and are characterized by a configuration which results from their novel method of preparation and which imparts to them particularly superior properties. While it is obvious that the biscuits may be of any size, under the preferred conditions of operation the total thickness from top to bottom will be, as hereinbefore noted, about 9/32 inch. The biscuits will be frusto-pyramidal shape and the preferred embodiment will have a substantial trapezoidal cross-section when viewed through a vertical plane. The bottom will be substantially flat and the surface generally will be glazed for the most part. Adjacent to the bottom of the biscuit will be a rough unglazed area which includes the portion of the dough sheet containing the separating or connecting portions thereof. This unglazed area will have a height and width of 25%–50% of the thickness of the biscuit, and may typically be 4/32 inch high. Each biscuit is characterized by a very high resistance to fracture and powdering and by its regular and attractive configuration.

Because of the presence of the large amount of unglazed area (which may be as much as 50% of the slant-surfaces of the frusto-pyramidal biscuit, the rate of adsorption of aqueous liquid is high.

While individual dough sheets may be prepared depending upon the apparatus available, it is preferred to produce a continuous sheet which is fed to a continuous oven, the rate at which the sheet progresses through the oven or the length of the oven being so regulated as to provide the desired baking period. Also, in addition to the type of breaker described above it is possible to use several pairs of oppositely rotating rubber rolls mounted above and below a horizontally moving belt which conveys the dough sheet through the oven and the breaker rolls.

While the present invention has been described with particular reference to the above specific example and in terms of specific operating conditions, procedures and apparatus, it is not to be construed as limited thereby but reference is to be had to the appended claims for a definition of the scope of the invention.

This application is a continuation-in-part of application Serial No. 565,537, filed February 15, 1956, by Hovey M. Burgess for Product and Process Therefor, abandoned July 12, 1958, and of application Serial No. 582,562, filed May 3, 1956, for Biscuit Die for Bits, by Hovey M. Burgess and Harvey H. Grice, issued June 3, 1958 as U.S.P. 2,837,043.

What is claimed is:

1. A process for producing substantially internally homogeneous kibbled biscuits characterized by rough unglazed edges which permit increased adsorption of aqueous liquids which comprises forming a workable dough of sufficient moisture content to yield acceptable liquid adsorption characteristics when the dough is baked and broken, forming said dough into a biscuit sheet, forming a plurality of separated frusto-pyramidal biscuits in said sheet interconnected by distinct sections of dough of a thickness such that on baking said interconnecting sections dry out more rapidly than said biscuits and form when broken biscuit edges of substantial cross-section, said sections having a width substantially equal to said thickness at which said sections will break faithfully thereacross when said sheet is broken, the sides of said biscuits being so disposed with respect to said sections that the latter are exposed directly to heat during baking, baking said sheet to reduce the moisture content thereof and to lower the moisture content of said sections below that of said biscuits to the point that upon cooling said sections are brittle and said biscuits are thermoplastic, cooling said sheet to breaking temperature, and breaking said sheet into individual biscuits at said brittle interconnecting sections.

2. A process for producing substantially internally homogeneous kibbled biscuits characterized by rough unglazed edges which permit increased adsorption of aqueous liquids which comprises adding about 50–60 parts by weight of aqueous liquid to about 100 parts by weight of dry ingredients containing about 50%–73% wheat flour thereby forming a wheat dough, forming said dough into a biscuit sheet, forming a plurality of separated frusto-pyramidal biscuits in said sheet interconnected by distinct sections of dough of thickness of about 25%–50% of the thickness of said biscuits, said sections being of a width substantially equal to said thickness at which said sections will break faithfully thereacross and when said sheet is broken, baking said dough sheet whereby the moisture content of the biscuits is reduced to about 17%–20% and the moisture content of the interconnecting dough sections is reduced to about 7%–12%, cooling said sheet to a breaking temperature at which the interconnecting sections are brittle and the biscuits are thermo-plastic, and breaking said sheet into individual biscuits at said temperature.

References Cited in the file of this patent
UNITED STATES PATENTS

| | | |
|---|---|---|
| 2,075,157 | Alberti | Mar. 30, 1937 |
| 2,385,068 | Eshbaugh | Sept. 18, 1945 |

FOREIGN PATENTS

| | | |
|---|---|---|
| 3,341 | Great Britain | Mar. 14, 1885 |